US011891852B1

(12) United States Patent
McSpadden

(10) Patent No.: US 11,891,852 B1
(45) Date of Patent: Feb. 6, 2024

(54) RAIL ASSEMBLIES AND METHODS OF MOUNTING RAIL ASSEMBLIES TO PANELS

(71) Applicant: Texas Automation Products, Inc., Hutchins, TX (US)

(72) Inventor: Jordan E. McSpadden, Hutchins, TX (US)

(73) Assignee: Texas Automation Products, Inc., Hutchins, TX (US)

( * ) Notice: Subject to any disclaimer, the term of this patent is extended or adjusted under 35 U.S.C. 154(b) by 0 days.

(21) Appl. No.: 18/365,958

(22) Filed: Aug. 4, 2023

Related U.S. Application Data

(63) Continuation of application No. 18/116,779, filed on Mar. 2, 2023.

(60) Provisional application No. 63/315,973, filed on Mar. 2, 2022.

(51) Int. Cl.
*E06B 3/58* (2006.01)
*E06B 3/54* (2006.01)
*E06B 3/46* (2006.01)

(52) U.S. Cl.
CPC .......... *E06B 3/5454* (2013.01); *E06B 3/4636* (2013.01); *E06B 3/4681* (2013.01); *E06B 3/5864* (2013.01)

(58) Field of Classification Search
CPC .................................................... E06B 3/5864
See application file for complete search history.

(56) References Cited

U.S. PATENT DOCUMENTS

| | | | | |
|---|---|---|---|---|
| 4,423,582 A * | 1/1984 | Yates | E06B 3/5864 52/766 |
| 4,671,016 A * | 6/1987 | Boeckx | E06B 3/5454 49/501 |
| 4,763,453 A * | 8/1988 | Horgan, Jr. | E04C 2/54 52/766 |
| 5,205,099 A * | 4/1993 | Grunhage | E06B 5/165 52/204.5 |
| 5,706,625 A * | 1/1998 | Vallance | A63C 19/10 403/374.1 |
| 7,210,267 B2 * | 5/2007 | VerSteeg | E05D 7/1044 49/446 |
| 7,584,588 B2 * | 9/2009 | Kim | E06B 3/5864 52/204.597 |
| 9,074,413 B1 * | 7/2015 | Sprague | E06B 3/5871 |

(Continued)

FOREIGN PATENT DOCUMENTS

| | | | |
|---|---|---|---|
| EP | 1085160 A2 * | 3/2001 | E05B 53/003 |
| EP | 1780367 A2 * | 5/2007 | E06B 3/54 |

(Continued)

*Primary Examiner* — Marcus Menezes
(74) *Attorney, Agent, or Firm* — Ferguson Braswell Fraser Kubasta PC

(57) ABSTRACT

A rail assembly may include a housing with a cavity and a channel in the cavity. A cam may be disposed in the channel. The cam may include an elongated portion. One or more locks may be disposed in the channel and contact an outer surface of the cam. When the cam is rotated from the open position, the position of the locks may be adjusted to retain a panel disposed in the rail assembly. When the cam is rotated from the closed position to the open position, the position of the locks may be returned to the initial position and the panel may be moved and/or removed.

20 Claims, 16 Drawing Sheets

(56) References Cited

U.S. PATENT DOCUMENTS

| | | | | | |
|---|---|---|---|---|---|
| 9,303,444 | B1 * | 4/2016 | Choi | E06B 3/60 | |
| 10,871,026 | B1 * | 12/2020 | Mourchid | E06B 3/5409 | |
| 11,459,766 | B2 * | 10/2022 | Seeboth | E04F 11/1846 | |
| 2002/0100234 | A1 * | 8/2002 | Sprague | E06B 3/5454 | 52/800.14 |
| 2007/0256383 | A1 * | 11/2007 | Kim | E06B 3/5864 | 62/3.6 |
| 2008/0236095 | A1 * | 10/2008 | Kim | E06B 3/5454 | 52/784.16 |
| 2010/0205880 | A1 * | 8/2010 | Lin | E06B 3/72 | 52/207 |
| 2020/0318421 | A1 * | 10/2020 | Murray | E06B 3/02 | |
| 2022/0018177 | A1 * | 1/2022 | Mourchid | E06B 3/5454 | |
| 2022/0333376 | A1 * | 10/2022 | Wu | E06B 3/5454 | |
| 2023/0198214 | A1 * | 6/2023 | Fries | H01R 43/24 | 439/736 |

FOREIGN PATENT DOCUMENTS

| | | | | | |
|---|---|---|---|---|---|
| ES | 1075610 | U | * | 11/2011 | E06B 3/5454 |
| WO | WO-9732638 | A1 | * | 9/1997 | A63C 19/10 |
| WO | WO-2016024299 | A1 | * | 2/2016 | E04F 11/1812 |

* cited by examiner

RAIL ASSEMBLIES AND METHODS OF MOUNTING RAIL ASSEMBLIES TO PANELS

CROSS-REFERENCE TO RELATED APPLICATIONS

This application is a continuation of U.S. patent application Ser. No. 18/116,779, filed Mar. 2, 2023, and entitled "RAIL ASSEMBLIES AND METHODS OF MOUNTING RAIL ASSEMBLIES TO PANELS," which claims the benefit of U.S. Provisional Application Ser. No. 63/315,973, filed Mar. 2, 2022.

BACKGROUND

The present invention relates to rail assemblies, and more particularly to rail assemblies that are capable of mounting to panels such as doors.

Frameless glass doors are popular and commonly used in commercial buildings. However, the frameless glass doors are cumbersome for installation, adjustment, and/or maintenance. The frameless glass doors include a glass panel coupled at a top and/or bottom to a rail. This rail secures the glass door to the door frame (e.g., a wall, a frame assembly, hinges, etc.). A bottom rail has a top side coupled to the glass and a bottom side positioned proximate a ground when the door is hung. Screws typically are drilled into the bottom side of the bottom rail to engage some type of wedge system to be drawn closer to the glass panel and exert a force on the glass panel to secure it to the rail. Thus, the rail is installed before the door is hung (e.g., because screws can not be accessed from the underside of the bottom rail when the door is hung). However, once the door is hung, it must be removed to make any adjustments to the glass position and/or for maintenance and/or repair. A top rail is similarly coupled. Thus, a new type of door rail system is needed.

SUMMARY

In various implementation, a rail assembly may have an open and a closed position. The rail assembly may move between the open and the closed positions via a cam that is engaged from an end of the rail assembly. Engaging the cam, and thus the rail opening and closing, allows easier installation and use of the rail mounting systems in various applications, such as glass door frames.

A rail assembly includes a housing with a first cavity. A channel may be disposed in the first cavity of the housing and the channel may be configured to receive one or more cams. The rail assembly may include lock(s) that contact the cam and are coupled to tracks in the cavity of the housing (e.g., the housing walls). As the cam rotates the lock position changes and the panel is either released or retained by the rail assembly.

The details of one or more implementations are set forth in the accompanying drawings and the description below. Other features, objects, and advantages of the implementations will be apparent from the description and drawings.

Other aspects of the invention will be apparent from the following description and the appended claims.

BRIEF DESCRIPTION OF DRAWINGS

For a more complete understanding of this disclosure and its features, reference is now made to the following description, taken in conjunction with the accompanying drawings, in which.

Like elements in the various figures are denoted by like reference numerals for consistency.

DETAILED DESCRIPTION

In various implementations, a panel mounting system may be utilized in glass door assemblies (e.g., frameless glass door), glass panel assemblies (e.g., interior glass walls such as for interior offices and/or screen walls), internal wall assemblies (e.g., cubicles, privacy screens, etc.), etc. The panel mounting system may be utilized to provide handrails, in some implementations. The panel mounting system may have a rail assembly and a panel coupled to the rail assembly. The panel may be removably coupled such that the panel may be adjusted (e.g., for position relative to the rail assembly and/or other components proximate the installation such as door frames, neighboring walls, etc.), removed for repair and/or replacement, in some implementations.

Figure 1:
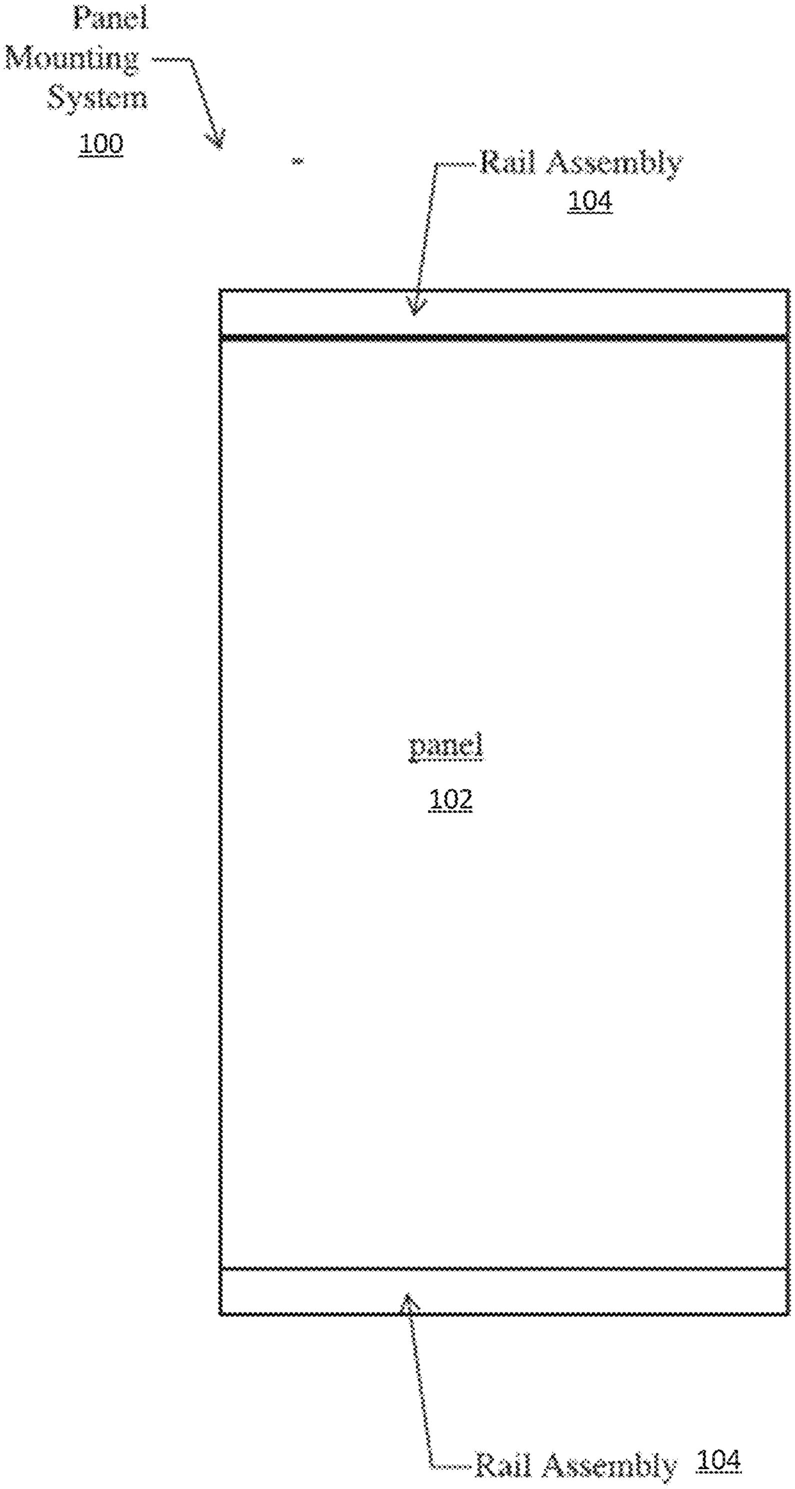
FIG. 1 illustrates an implementation of an example mounted panel system according to illustrative embodiments.

FIG. 1 illustrates an implementation of a panel mounting system (100). The panel mounting system (100) includes a panel (102) coupled to a rail assembly (104). As illustrated, the panel (102) may be coupled to rail assemblies at a first end and a second opposing end of the panel (102). In some implementations, the panel (102) may be coupled at a first end to a rail assembly (104) and have a free opposing second end.

Figure 2:
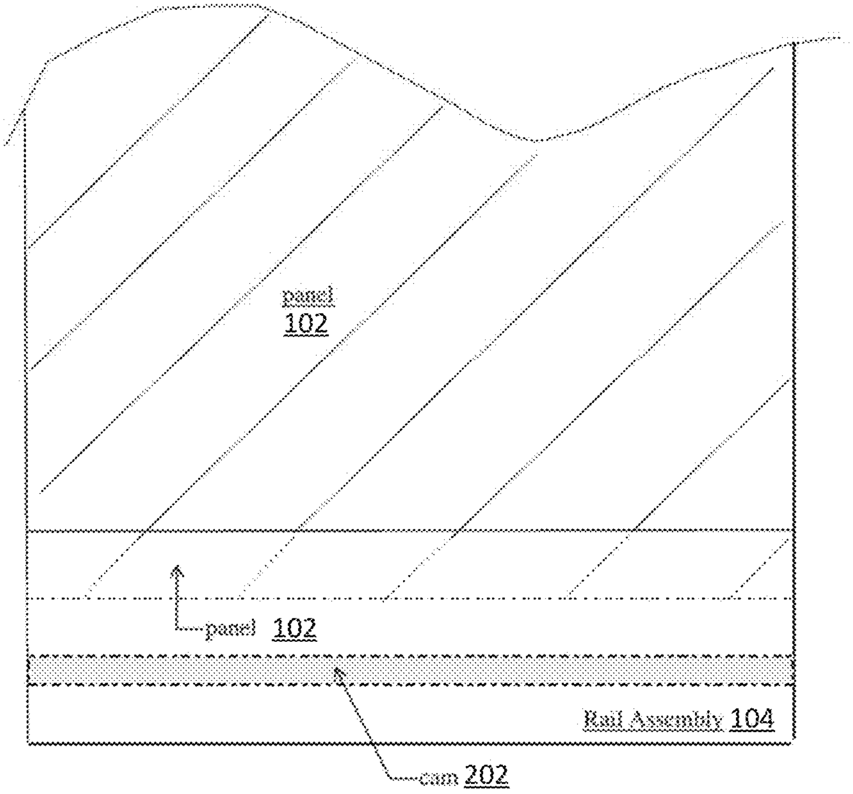
FIG. 2 illustrates an implementation of a portion of the example mounted panel system illustrated in FIG. 1.

FIG. 2 illustrates an implementation of an example portion of the panel mounting system (100) illustrated in FIG. 1. As illustrated, the panel (102) extends into the rail assembly (104). The rail assembly (104) includes at least one cam (202). The cam(s) (202) may extend (e.g., in an internal channel) at least partially along a length of the housing of the rail assembly (104). For example, as illustrated a single cam (202) may extend along the length of the housing.

Figure 3:
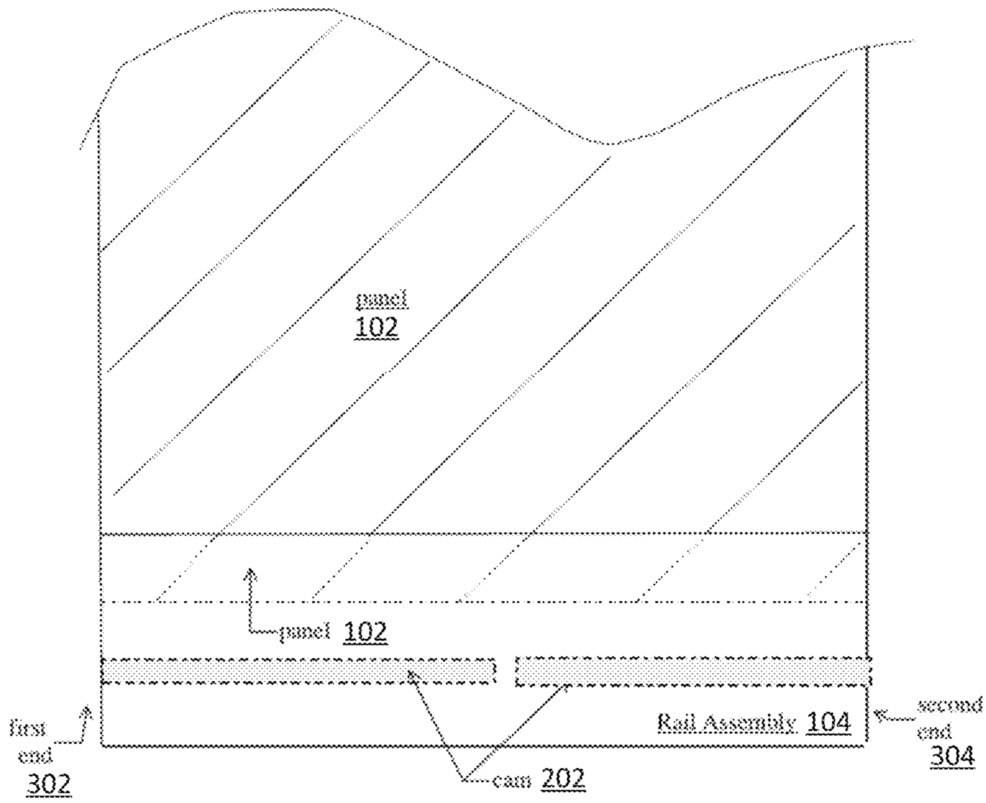
FIG. 3 illustrates an implementation of a portion of the example mounted panel system illustrated in FIG. 1.

As illustrated in FIG. 3, two cams (202) (e.g., of different or similar lengths) may be utilized such that a first cam (202) is disposed proximate a first end (302) of the housing of the rail assembly (104) and a second cam (202) is disposed proximate a second end (304) of the housing of the rail assembly (104).

Operation of the cam (202) may dispose the rail assembly (104) in an open or closed position. When the rail assembly (104) is in the open position, the panel (102) may not be coupled to the rail assembly (104) (e.g., FIGS. 6-10) and the position of the panel (102) may be adjusted and/or the panel (102) may be removed. When the rail assembly (104) is in the closed position, the rail assembly (104) may retain the panel (102). For example, the rail assembly (104) may inhibit the panel (102) from uncoupling from the rail assembly (104) when a force is applied to the panel (102).

Figure 4:
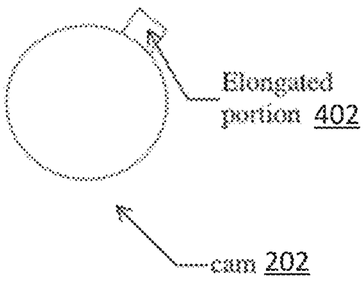
FIG. 4 illustrates an implementation of an example cam according to illustrative embodiments.

FIG. 4 illustrates an end view of an implementation of an example cam (202). The cam (202) may have a length and a uniform and/or non-uniform cross-sectional shape along the length. The cam (202) may have a body with an elongated portion (402). The elongated portion (402) may allow the diameter of a cross-section of the cam (202) to be greater at least one point than at least one other point, as illustrated in FIG. 2. As illustrated, the cam (202) has a protrusion that operates as the elongated portion (402).

Figure 5:
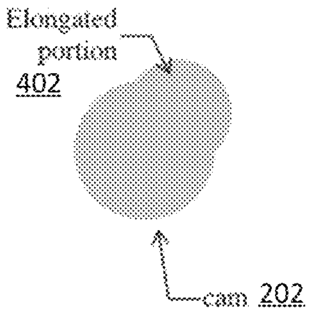
FIG. 5 illustrates an implementation of an example cam according to illustrative embodiments.
Figure 6:
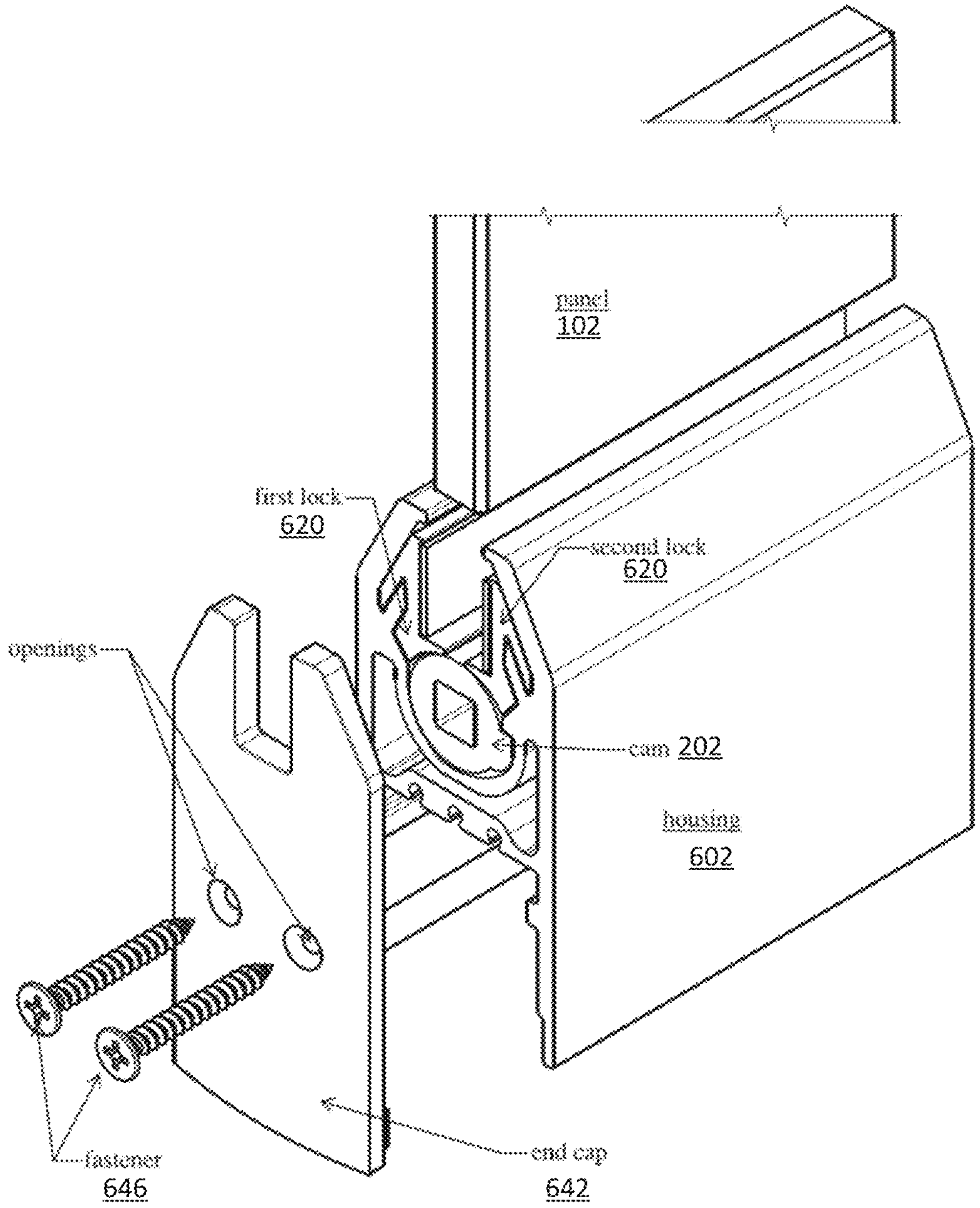
FIG. 6 illustrates side perspective view of an implementation of an example rail assembly system, with the rail assembly in the open position, according to illustrative embodiments.
Figure 7:
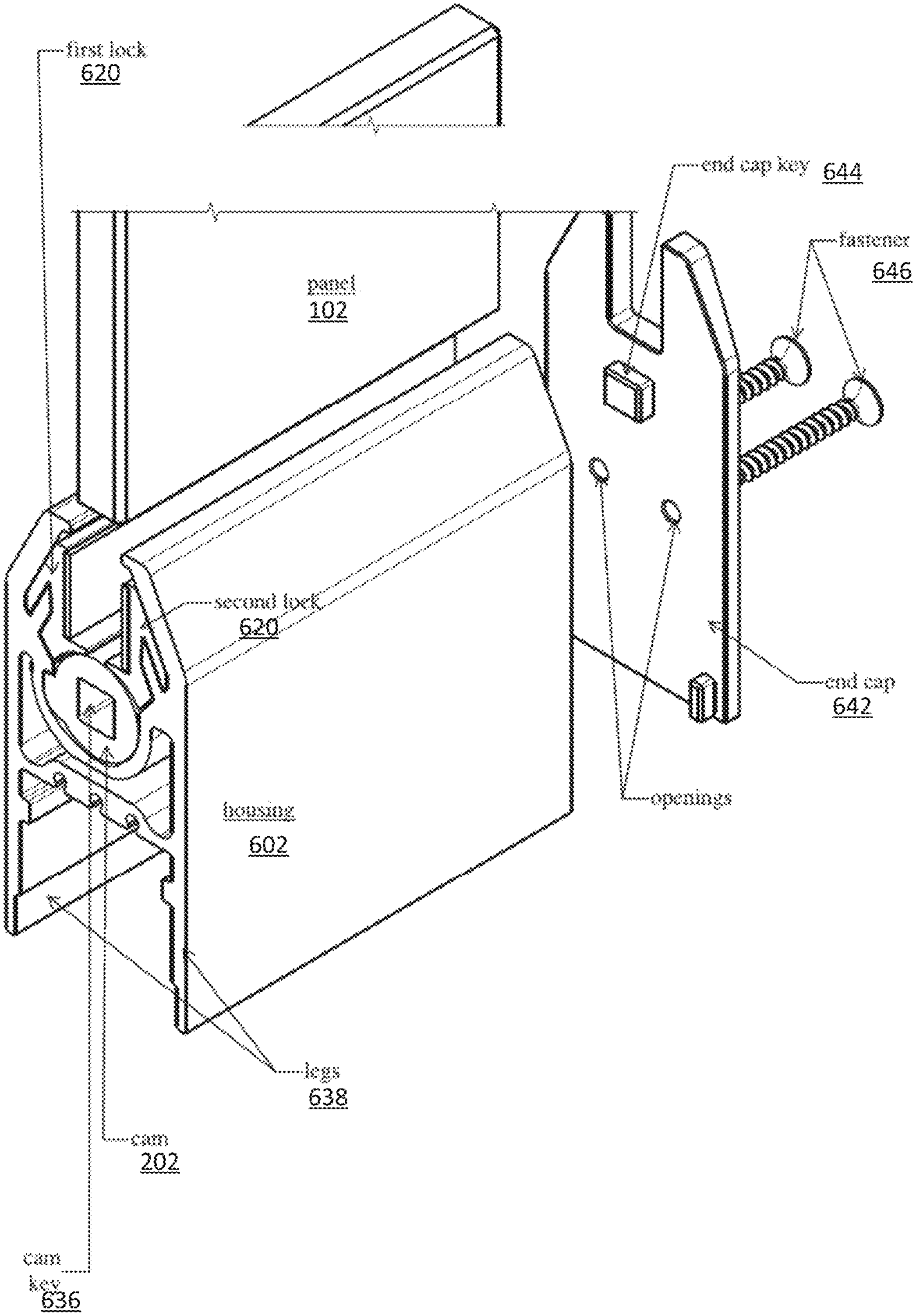
FIG. 7 illustrates side perspective view of an implementation of the example rail assembly system illustrated in FIG. 6.
Figure 8:
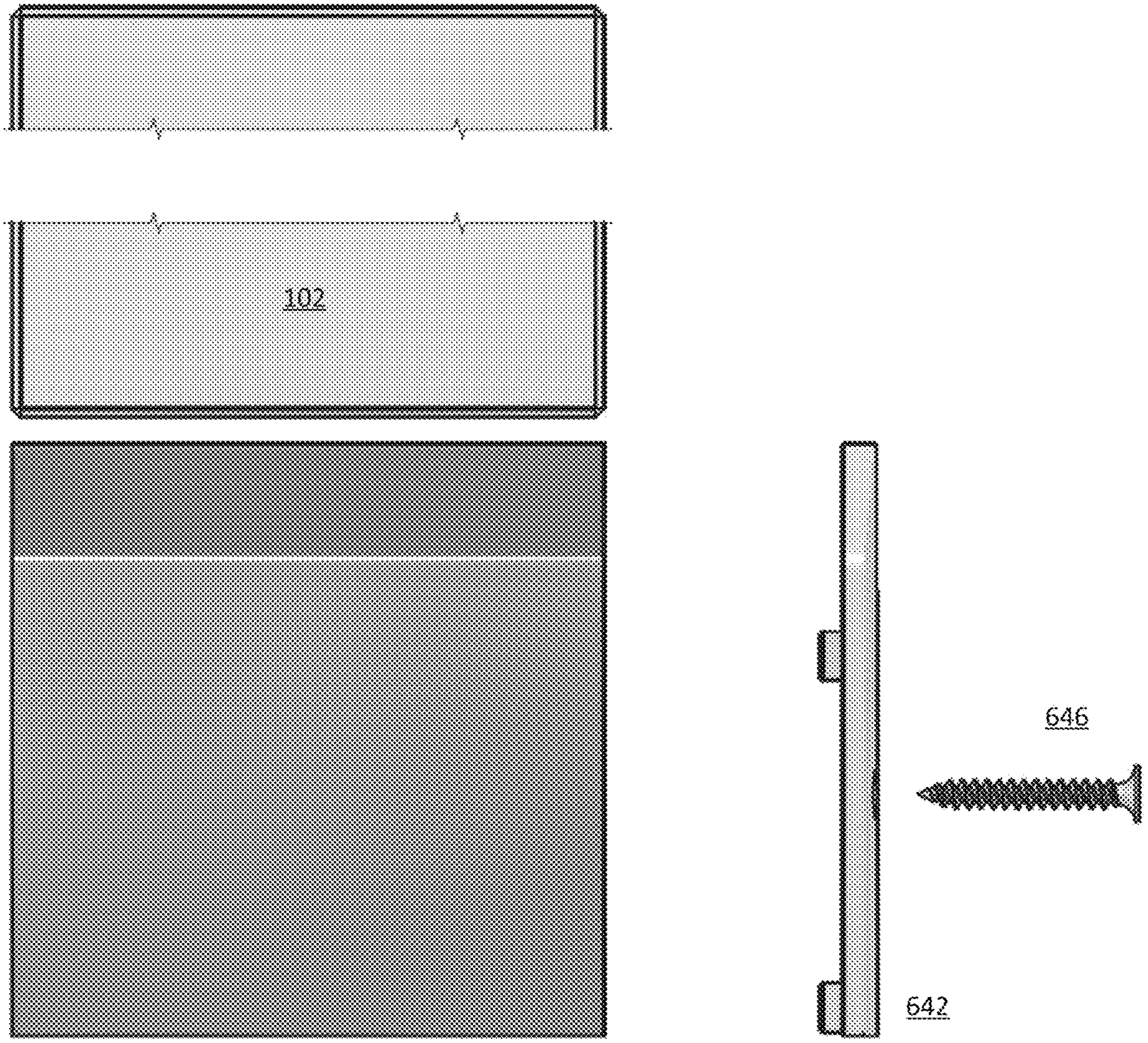
FIG. 8 illustrates side view of an implementation of the example rail assembly system illustrated in FIG. 6.

FIG. 5 illustrates an end view of an implementation of an example cam (202). The elongated portion (402) of the cam (202) of FIG. 3 has radiused sides.

The rail assembly (104) may be disposed in an open position to insert (e.g., mount) a panel (102), to reposition a panel (102) (e.g., commonly in the field adjustments after attaching a door to a door frame allow a better aesthetic and/or operation), to repair a panel (102), to repair components blocked by the panel (102) when in use (e.g., frame components), etc. The rail assembly (104) may be disposed in a closed position to secure (e.g., temporarily and/or permanently) one or more panels to the rail assembly (104).

FIGS. 6 to 10 illustrate various view of an implementation of a portion of a panel mounting system (100) in which the rail assembly (104) is disposed in an open position.

FIGS. 13-16 illustrate various view of an implementation of a portion of a panel mounting system (100) in which the rail assembly (104) is disposed in a closed position. As illustrated the rail assembly (104) includes a housing (602). The housing (602) may include a first side (604), a second opposing side (606), a third side (608) disposed between the first side (604) and the second side (606) (e.g., proximate an end cap location), and a fourth side (610) disposed opposite to the third side (608) (e.g., proximate an end cap location). The housing (602) may include a first cavity (612) proximate the first side (604). The first cavity (612) may include a channel (614). The channel (614) may have a semi-circular interior shape. The channel (614) may be a portion of inner walls of the housing (602) proximate the first cavity (612), an insert disposed in the first cavity (612), etc.

Referring back to FIGS. 9-10, the housing (602) may include one or more arms (616, 618). As illustrated, the arms (616, 618) extend from the body of the housing (602) and are disposed closer to a first side (604) of the housing (602) than the channel (614) (e.g., above the channel). The arms (616, 618) may include a free end. The arms (616, 618) may be disposed such that the free ends of the arms (616, 618) are closer to each other than the ends of the arms (616, 618) coupled to the housing (602).

The free end may include one or more lip(s) (621) (e.g., first lip and second lip) that extend inwards from the arm. The lip(s) (621) may inhibit release of the cam (202) and/or lock(s) (620) through the first end (302) of the housing (602).

The first cavity (612) may include one or more track(s) (622, 624). As illustrated the first track (622) is disposed closer to the first side (604) of the housing (602) than the channel (614) (e.g., above the channel). A second track (624) may be disposed opposite the first track (622) and be disposed closer to the first side (604) of the housing (602) than the channel (614) (e.g., above the channel). In some implementations, the first track (622) may be disposed on an inner surface of a first arm (616) and/or a second track (624) may be disposed on an inner surface of a second arm (618).

The rail assembly (104) may include one or more lock(s) (620). The lock(s) (e.g., first lock and second lock illustrated in FIG. 9, 10) may be disposed in the first cavity (612) of the housing (602).

The lock(s) (620) may include a first flange (626), a first foot (628) and a first lock ledge (630). A lock recess (632) may be disposed between the flange (626) of the lock(s) (620) and the foot (628) of the lock(s) (620). The lock recess (632) may receive the track(s) (622, 624) of the housing (602). In some implementations, a lock(s) (620) may include a protrusion received in a recess of the track(s) (622, 624) of the housing (602). The use of a track(s) (622, 624) may guide the position of the lock(s) (620) during assembly of the rail system, may inhibit release of the lock(s) (620) from the housing (602), etc.

In some implementations, a pad (634) (e.g., silicone, plastic, cork, foam, etc.) may be coupled to an exterior surface of the lock(s) (620). As illustrated the pad (634) may be disposed on an opposite side of the lock(s) (620) as the flange (626). The lock(s) (620) may include a lock ledge (630), which may be disposed on an opposite side of the lock(s) (620) as the first flange (626). The lock ledge (630) may inhibit the pad (634) from sliding out of the first cavity (612) and/or releasing from the lock(s) (620) when panel(s) (102) are being coupled to the rail assembly (104). The lock(s) (620) may include a foot (628). The foot (628) may be disposed proximate the cam (202) in the rail assembly (104). The foot (628) may have a portion (e.g., at least a portion of the lower outer surface) that has a shape similar to a shape of a at least a portion of the cam (202). Such that the cam (202) may contact the foot (628) of the lock(s) (620).

The cam (202) of the rail assembly (104) may be disposed in the channel (614). The cam (202) may have a length and one or more cross-sectional shapes (e.g., similar and/or different) along the length. As illustrated, the cam (202) may include an elongated portion (402). The elongated portion (402) may be a protrusion, an extension, etc.

The cam (202) may include a cam key (636). The cam key (636) may include a male and/or female key portions. The male key may be a protrusion extending from at least one end of the cam (202). The female portion may include an opening extending at least partially through the cam (202) (e.g., an opening in an end of the cam (202), an opening through the cam (202), etc.). The illustrated cam (202) includes an opening disposed through the length of the cam (202). When the rail assembly (104) is in the open position the elongated portion (402) of the cam (202) may be disposed adjacent to a bottom (e.g., floor) of the channel (614). To alter the position of the rail assembly (104) to closed (e.g., to couple a panel (102) to the rail assembly (104)), the cam (202) may be rotated such that the elongated portion (402) of the cam (202) may contact the bottom portion of the channel (614) (e.g., floor) which changes the cam (202) cross-sectional diameter proximate the center axis.

Figure 12:
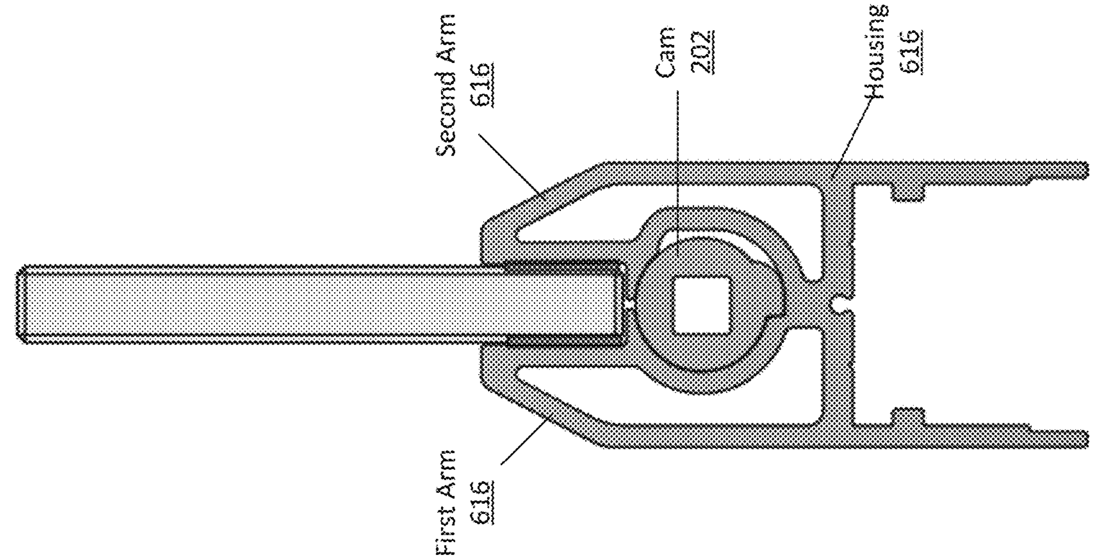
FIG. 12 illustrates another side view of an alternative implementation of the example rail assembly system illustrated in FIG. 11.
Figure 11:
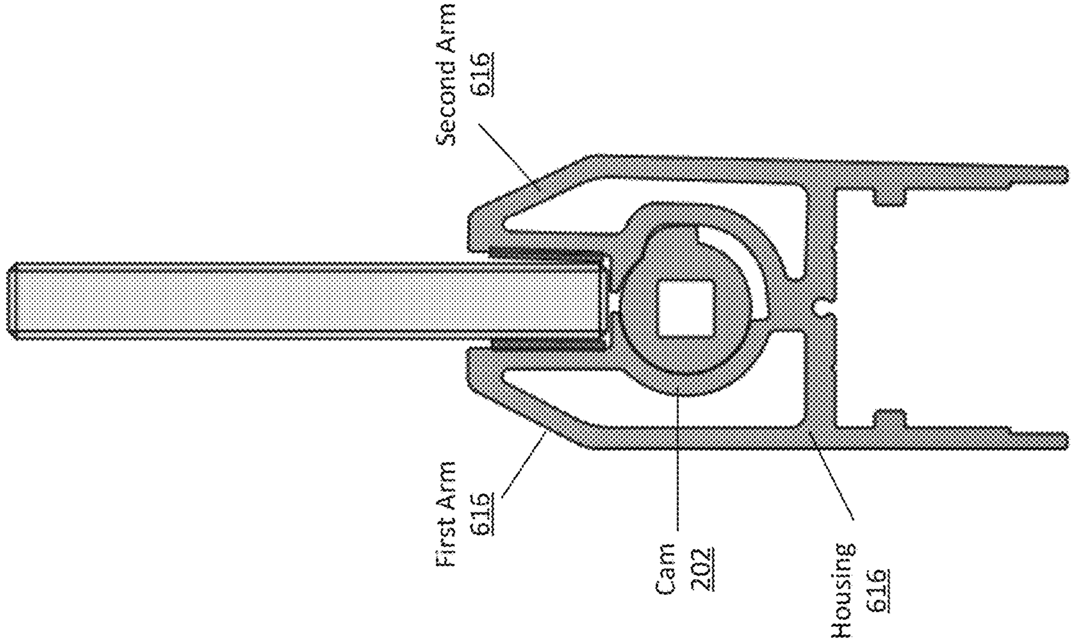
FIG. 11 illustrates a side view of an alternative implementation of the example rail assembly system, according to illustrative embodiments.
Figure 13:
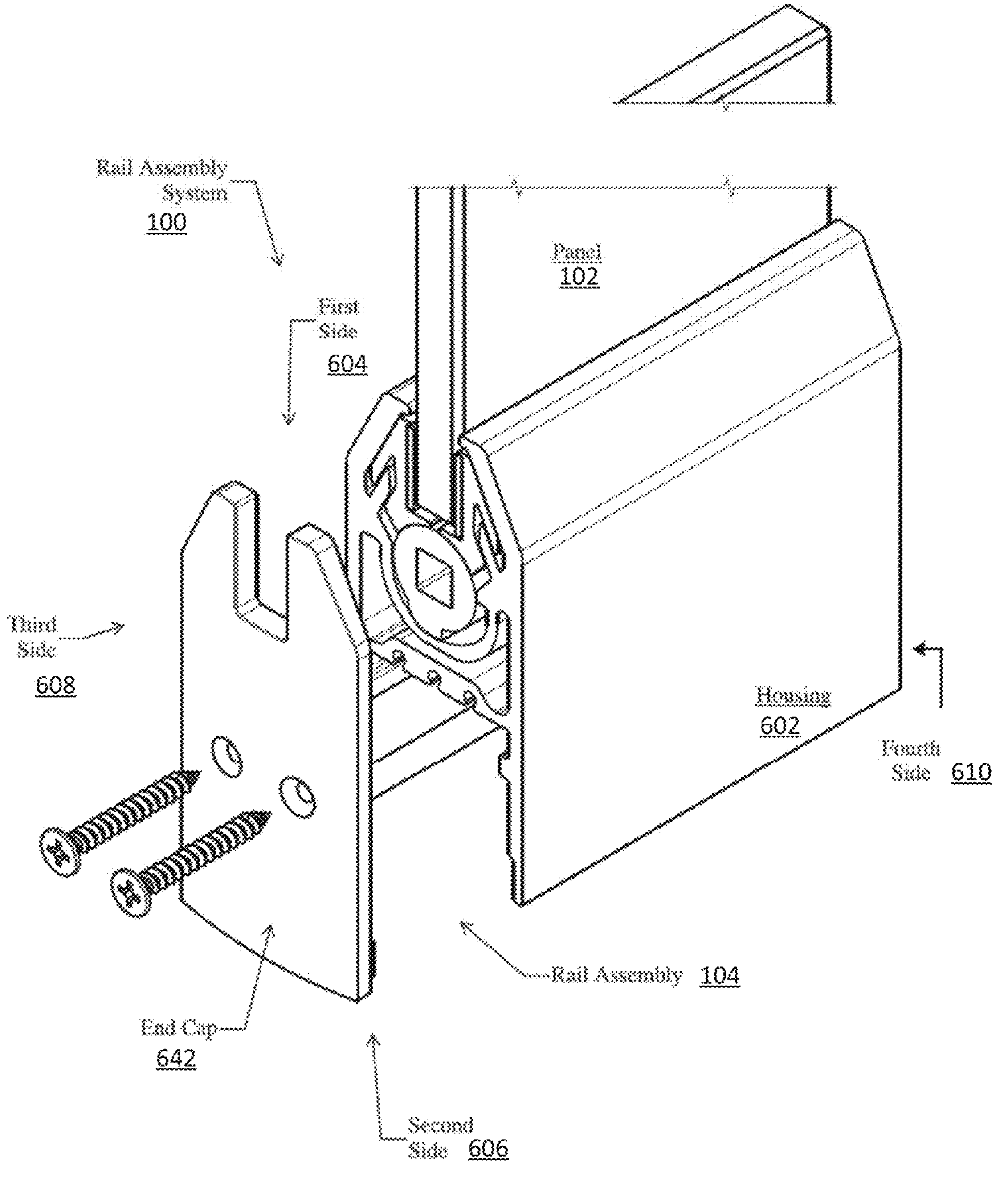
FIG. 13 illustrates side perspective view of an implementation of an example rail assembly system, with the rail assembly in the closed position, according to illustrative embodiments.
Figure 14:
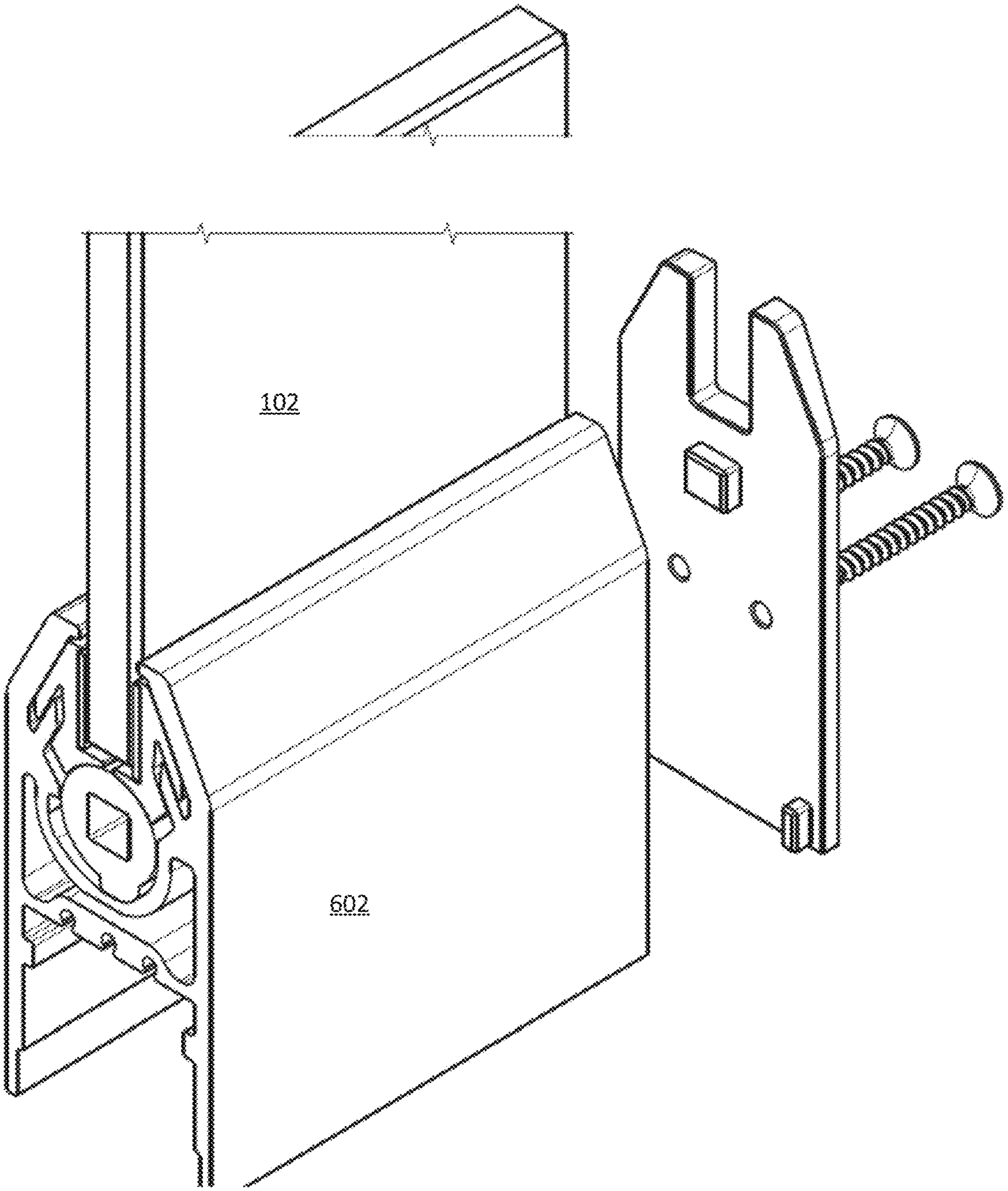
FIG. 14 illustrates side perspective view of an implementation of the example rail assembly system illustrated in FIG. 13.
Figure 15:
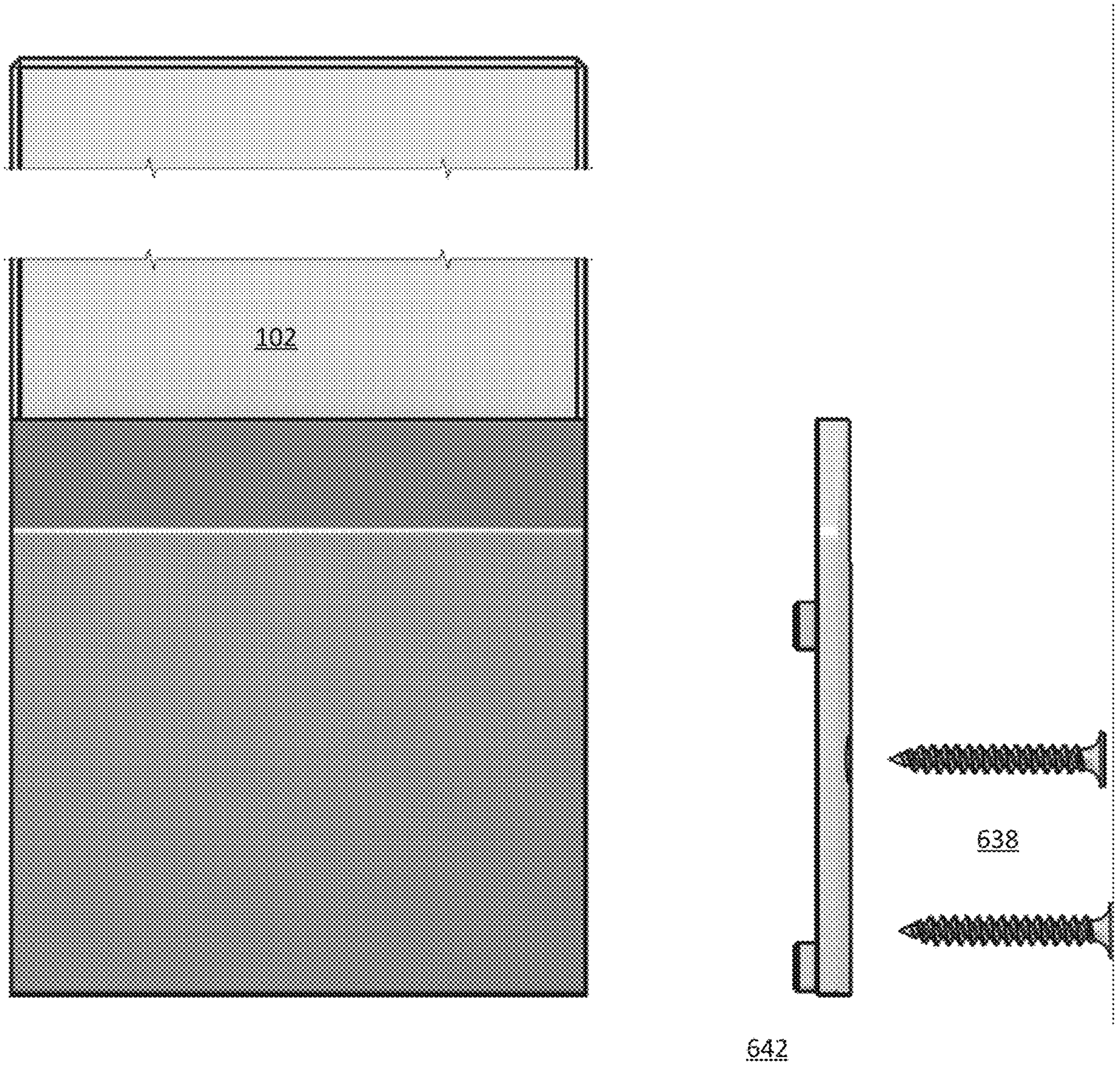
FIG. 15 illustrates side view of an implementation of the example rail assembly system illustrated in FIG. 13.

FIGS. 11-12 illustrate an alternative embodiment implementation of the rail assembly system. In the open position of FIG. 11, cam (202) applies a preload expansive force to the arms (616, 618) of housing (602). Rotation of the cam (202) into the closed position, illustrated in FIG. 12, releases the preload, and compressing the panel (102) between the arms (616, 618).

FIGS. 13-16 illustrate various view of an implementation of a portion of a panel mounting system (100) in which the rail assembly (104) is disposed in a closed position.

Figure 9:
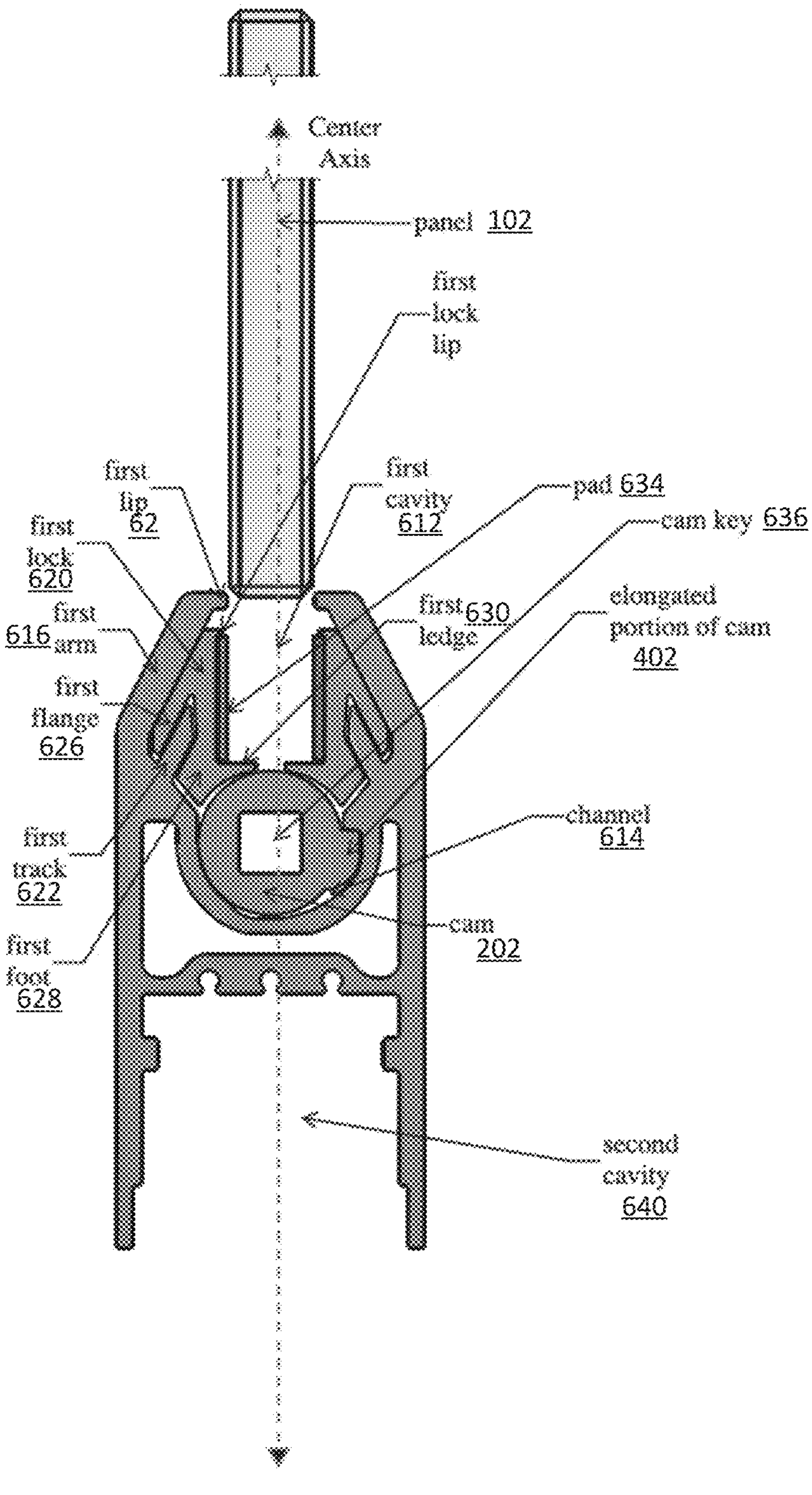
FIG. 9 illustrates another side view of an implementation of the example rail assembly system illustrated in FIG. 6.
Figure 10:
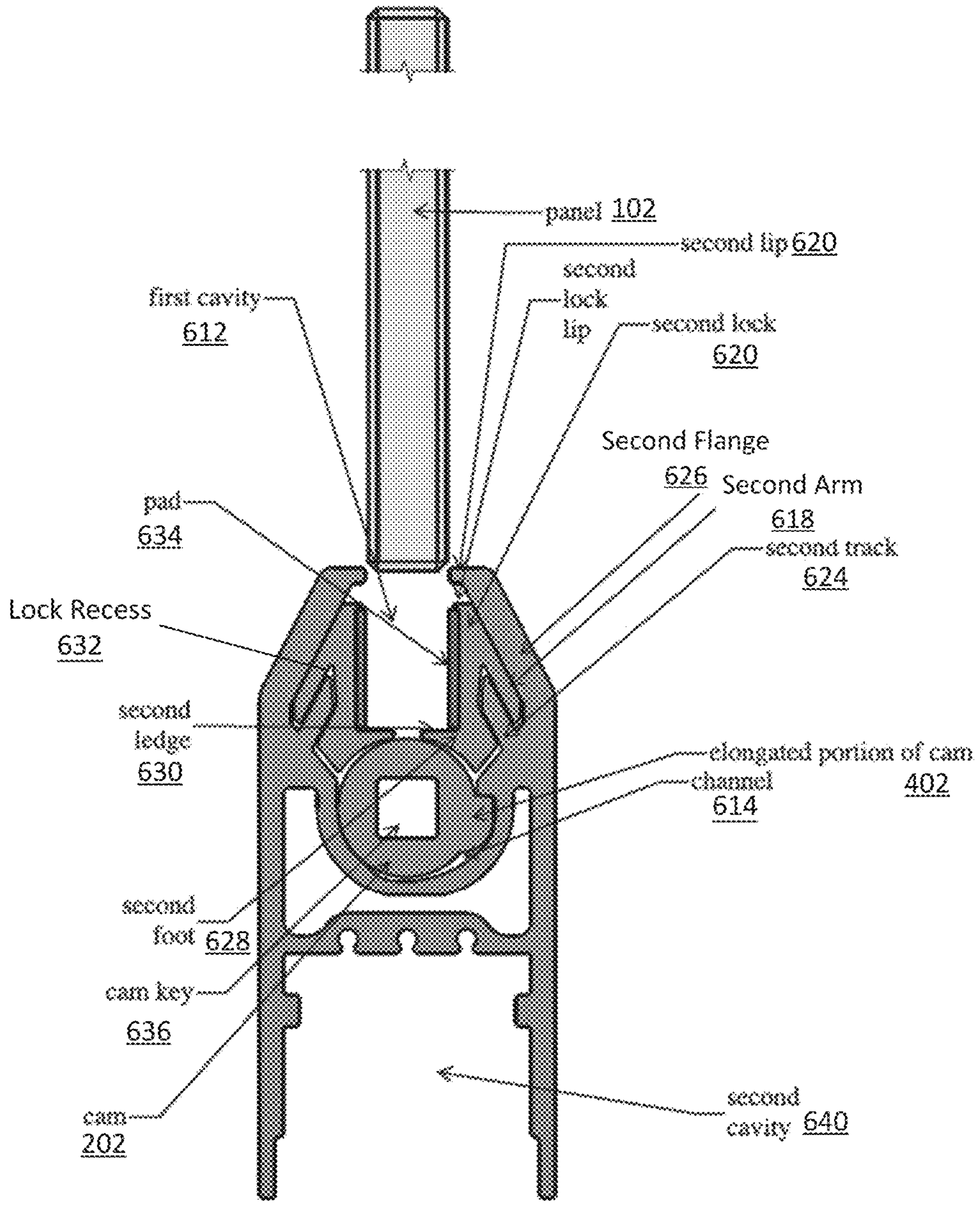
FIG. 10 illustrates another side view of an implementation of the example rail assembly system illustrated in FIG. 6.
Figure 16:
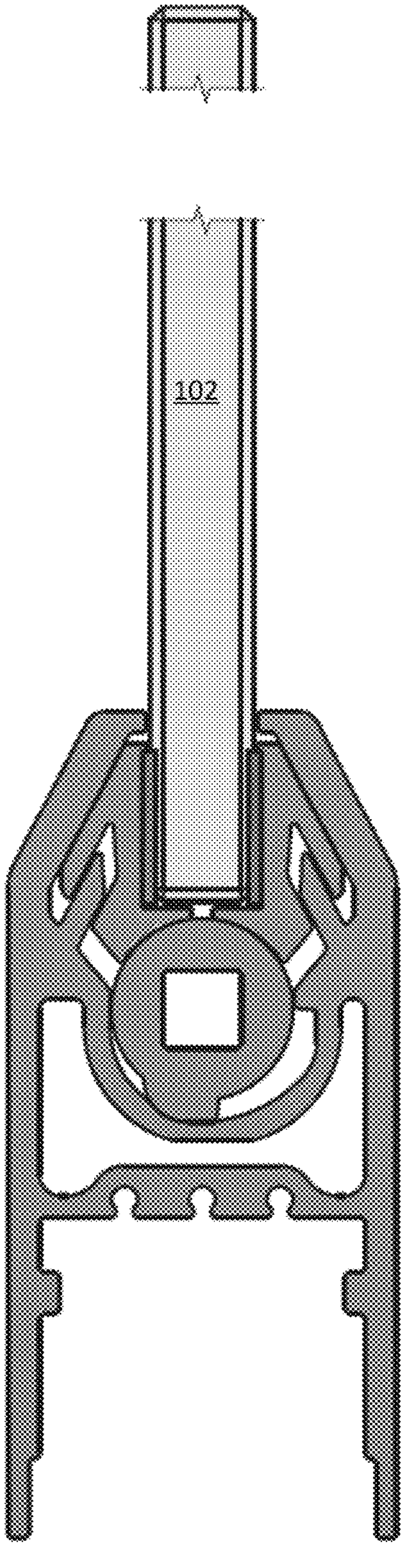
FIG. 16 illustrates another side view of an implementation of the example rail assembly system illustrated in FIG. 13.

As illustrated in the comparison between FIG. 16 and FIG. 9, the cam (202) diameter is larger proximate the center axis in the closed position illustrated in FIG. 16 than in the open position in FIG. 9. As the cam (202) rotates from the open to the closed position, the foot (628) of the lock(s) (620) is pushed closer towards the first side (604) of the rail assembly (104) than it had been in the open position (e.g., because the cam (202) diameter increases). As the foot (628) is pushed closer towards the first side (604) of the rail assembly (104), the position of the arms (616, 618) causes the lock(s) (620) to move closer to the center line and narrows the space between the lock(s) (620) and any other lock(s) (620) and/or wall of the housing (602) on an opposite side. This narrowing causes the pad(s) (634) to contact the panel (102) and/or compress the pad(s) (634). Thus (e.g., when or as the rail assembly (104) approaches the closed position), the panel (102) is retained by the lock(s) (620) of the rail assembly (104). The cam (202) diameter only increases a specified amount to inhibit overtightening of the rail assembly (104). Overtightening of the rail assembly (104) may cause a panel (102) to prematurely fail (e.g., crack).

The shape of the cam (202) key may correspond to a tool used to operate (e.g., rotate) the cam (202). For example, an approximately square shaped key (e.g., square shaped opening and/or protrusion) may engage a power or manual tool capable of engaging the key such as, but not limited to an Allen wrench, a socket wrench, etc. When the tool is coupled to the key to the cam (202), the user may cause the rotation of the cam (202).

As illustrated, the operation of the cam (202) (e.g., rotation) is performed at an end of the rail assembly (104) (e.g., third side and/or fourth side). Thus, unlike currently available rail assemblies, the cam (202) is more easily operated in the field. For example, when a panel (102), such as a door is unmounted, it is easy to access the bottom of the door and conventionally one would drive screws into a rail assembly (104) and the bottom of the door. However, once this door is installed, it is difficult to access bottom and top portions of the door. The clearance to the floor is often minimal and the clearance above may be difficult to access due to height. Thus, if a user wants to uncouple the door from the rail assembly (104) (e.g., to adjust) the door must be unmounted from the frame. This takes time and increases the chance of breakage, especially of glass doors.

Additionally, the operation of the cam (202) may enable easier assembly and unmounting the door while also assuring consistency of the applied retention force. For example, a single cam maybe torqued to desired force, thereby applying consistent pressure to the panel (102) along the length of the rail assembly (104).

However, with the described rail assemblies, a user does not need access to the bottom and instead accesses the operation of the cam (202) at an end of the door. The ends of the door may be easier to access even when the door is hung. Thus, when a door or other type of panel (102) needs adjustments post hanging, which is common, adjustments may be made easily by operating the cam (202) to open and close the rail assembly (104) (e.g., the rail assembly (104) may be opened, the panel (102) may be adjusted, and the rail assembly (104) may be closed to resecure the panel (102) in the new position). This reduction in time and ease of operation may reduce costs associated with installation and maintenance of doors, such as frameless glass doors.

The movement of the cam (202) may be inhibited without the tool. For example, the channel (614) may have a size that inhibits movement of the cam (202) from the open to the closed position or the closed to the open position unless a predetermined force is applied to the cam (202). The predetermined force may be greater than those introduced during regular use of the panel (102) and/or rail assembly (104) (e.g., from floor vibrations, from opening and closing doors, from contact with people, etc.). Thus, the cam (202) may retain panel(s) (102) while in the closed position. In the open position, the lock(s) (620) may slide down the track(s) (622, 624) and exert a specified force (e.g., by the weight of the lock(s) (620)) on the cam (202) to inhibit rotation until the user applies the predetermined force to cause closure of the rail assembly (104). The channel (614) may be sized and/or shaped such that a predetermined force is applied before the cam (202) rotates (e.g., the channel (614) may have a slight elliptical shape). The channel (614) may be rigid such that rather than the channel (614) deforming upon rotation of the cam (202), at least a portion of the cam (202) body is moved upwards to raise the lock(s) (620) position relative to its previous position (e.g., when moving the cam (202) from a position corresponding to the rail assembly (104) being in the open position to a position corresponding to the rail assembly (104) being in the closed position).

The housing (602) may include leg(s) (638) in some implementations. A second cavity (640) may be disposed between the leg(s) (638) and proximate the second end (304) of the housing (602). The second cavity (640) may allow the rail assembly (104) to receive door rail components (e.g., such as standard door components that are typically disposed in lower and/or upper rails such as locks.

One or more end caps (642) may be coupled to the housing (602) in various implementations. The end cap (642) may provide an aesthetic or a function desirable to a user. For example, the end cap (642) may provide a clean look, protect internal parts of the rail assembly (104), and inhibit dust and debris from entering at least a portion of the rail assembly (104). The end cap (642) may frictionally couple with the housing (602) and/or be coupled via fasteners (646) (e.g., as illustrated in FIGS. 6, 7, 13, 14).

In some implementations, an end cap (642) may include a second lock(s) (620) for the rail assembly (104). As illustrated in FIGS. 7, 8, 14, 15, an end cap key (644) may be disposed. The cap key may align with the cam key (636). The cap key may have a size and shape such that it can couple with the cam key (636). For example, the cap key may be at least partially received by the cam key. As illustrated the cap key may be a protrusion and the cam key may receive the protrusion. The cap key may inhibit rotation of the cam (202) when coupled. Thus, the cap key may function as a second lock(s) (620) to inhibit the cam (202) from rotation until desired by a user.

The rail assembly (104) may be transported in pieces and so the rail assembly (104) may be assembled. In some implementations, the rail assembly (104) may be customized in size. The rail assembly (104) may be offered in one or more lengths and users may cut one or more rail assemblies for use in applications from one of the rail assemblies of a specified length. For example, a custom door size may be requested rather than an industry standard size. The rail assembly (104) may be cut either once assembled or piece by piece due to the nature of the rail assembly (104) and a custom installation may be achieved. In contrast, custom doors typically require extensive delays as manufacturers create a custom product. To assemble the rail assembly (104), one or more cams (202) may be inserted into the channel (614) of the housing (602) of the rail assembly (104). Once or more lock(s) (620) may be inserted into the track(s) (622, 624) of the housing (602). In some implementations, the pad (634) may be coupled to the lock(s) (620) prior to inserting the lock(s) (620) into the track(s) (622, 624) (*s*) of the rail assembly (104). In some implementations, the ability to disassemble the rail assembly (104) may allow reuse, facilitate transportation, and/or allow replacement of worn and/or broken parts.

During installation of one or more panels in the rail assembly (104), a rail assembly (104) in the open position has an initial width between the lock(s) (620) of the rail assembly (104). The panel (102) may or may not contact one or more of the pad(s) (634) on the lock(s) (620). A user may then engage and operate the cam (202) to close the rail assembly (104). Utilizing a tool (e.g., a power or manual socket wrench), the user may cause the cam (202) to rotate and push upwards (e.g., towards the first side (604) of the rail assembly (104)) on the foot (628)/feet of the lock(s) (620) of the rail assembly (104) to raise the position of the lock(s) (620) relative to their prior initial position. As the lock(s) (620) raise, the width between the lock(s) (620) decreases and the panel (102) is retained. The user and the lock(s) (620) are inhibited from overtightening the panel (102) (e.g., and risking damage and/or diminished aesthetics) since cam (202) only raises the lock(s) (620) by a specified maximum distance (e.g., the difference between the largest cross-sectional diameter of the cam (202) and the smallest cross-sectional diameter of the cam (202). The end cap(s) may then be coupled to the housing (602) (e.g., via fasteners (646) and/or frictional fit).

In some implementations, the panel (102) secured to the rail assembly (104) may then be installed in a determined location.

The panel (102) can be adjusted removed from the rail assembly (104) in a similar manner. If the rail assembly (104) includes end caps, the end caps may be removed. The cam (202) may be rotated in the opposite direction to allow the lock(s) (620) to return to their initial position (e.g., associated with an open rail assembly (104)) and the width between the lock(s) (620) may increase to allow the panel (102) to be removed and/or position of the panel (102) to be adjusted. Unlike with conventional rail assemblies, the panel (102) does not require dismounting from a frame to adjust the position or remove the panel (102). This may increase user satisfaction (e.g., end user and maintenance companies) since the time and/or cost to adjust and/or replacements may be decreased.

Figure 18:
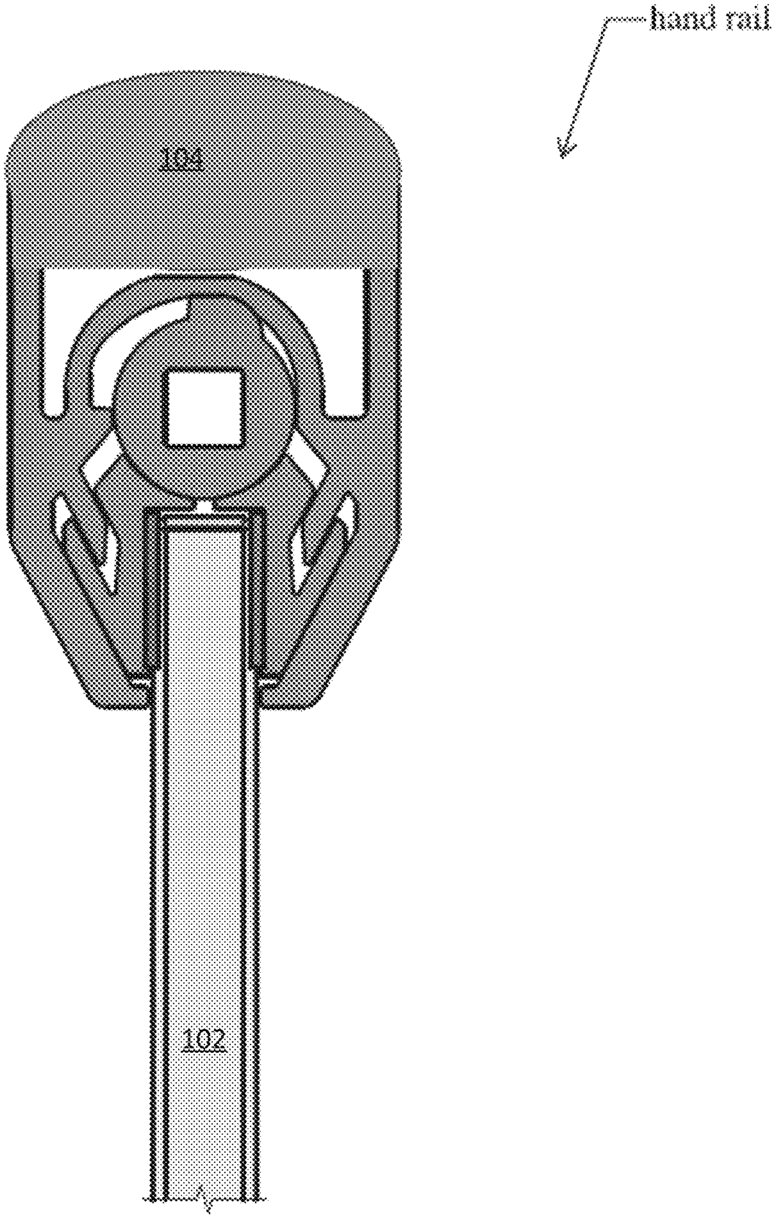
FIG. 18 illustrates an implementation of an example rail assembly installed as a handrail, according to illustrative embodiments.

In various implementations, a panel mounting system (100) may be utilized for railing in commercial and/or residential buildings and/or outdoor areas. The panel mounting system (100) may include one or more panels (102) and one or more rails. The panel (102) may be a wall (e.g., in place of balusters) and/or balusters. The rail system may be mounted on bottom and/or top of the panel(s) (102). The rail system mounted at a top of the panel (102) may be capable of operating as a handrail, as illustrated in FIG. 18. The housing (602) of the rail assembly (104) may have a shape, such as an ergonomic shape, and/or a texture (e.g., protrusions, coatings, etc.) to facilitate use as a handrail. The panel mounting system (100) may include a frame and/or coupling members between the panels (102) such that the rail assemblies may be coupled together (e.g., directly and/or indirectly). The panel mounting system (100) may allow formations of cubicles, separation walls, separation panels, room dividers, etc.

In various implementations, a panel mounting system (100) may include one or more panels (102) and one or more rails. The panel mounting system (100) may be modular. The panel mounting system (100) may include a frame and/or coupling members between the panels (102) such that the rail assemblies may be coupled together (e.g., directly and/or indirectly). The panel mounting system (100) may allow formations of cubicles, separation walls, separation panels, room dividers, etc.

Figure 17:
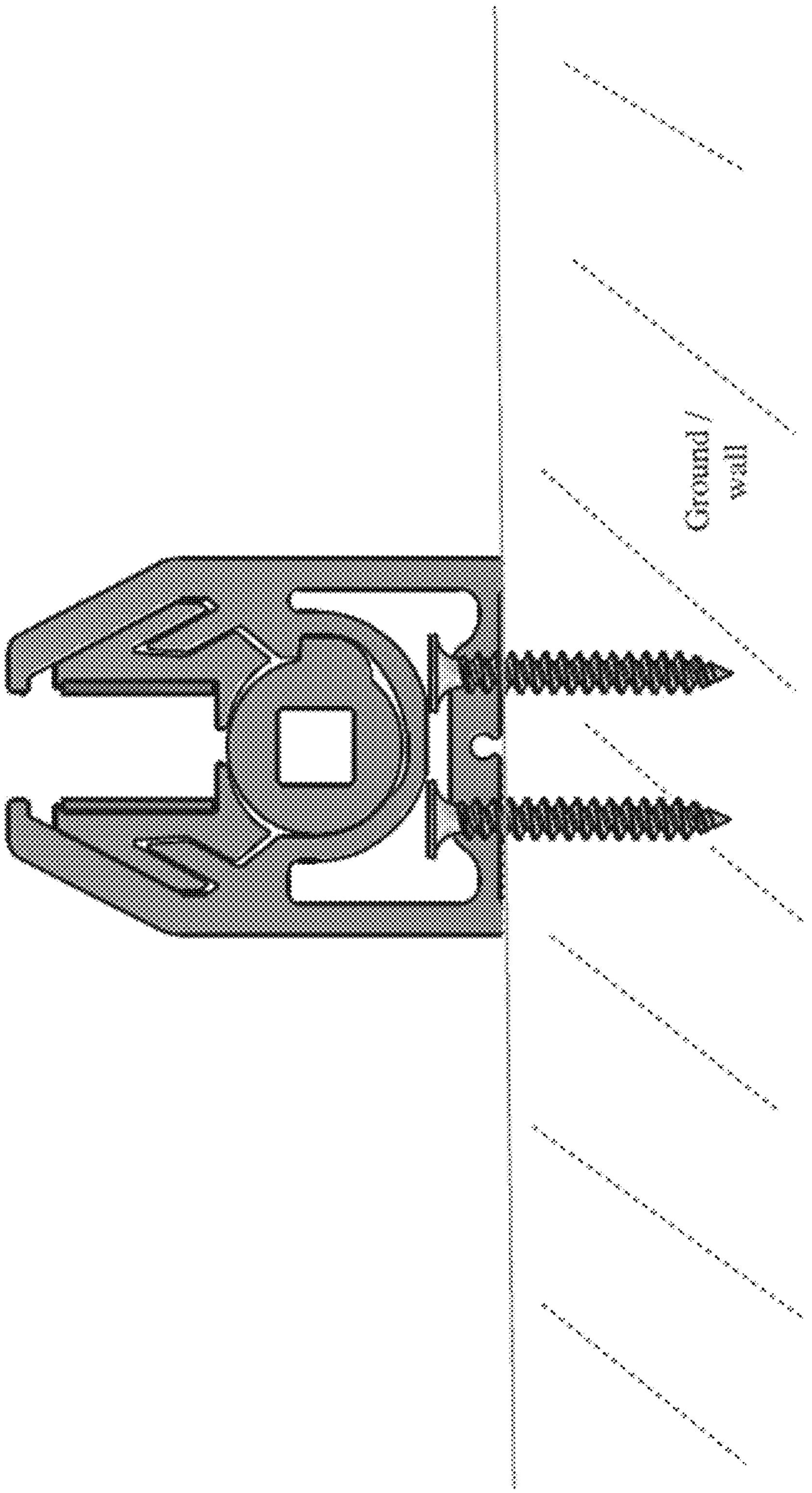
FIG. 17 illustrates an implementation of an example rail assembly installed on a ground or wall application, according to illustrative embodiments.

In some implementations, the rail mounting system may be installed on the floor or a wall using a rail assembly (104), such as the rail assembly (104) illustrated in FIG. 17. The panels (102) may be privacy glass, fabric panels, medium density fiberboard (mdf) panels, soundproof panels, and/or any other type of panel. User satisfaction may increase with use of the rail mounting system to create cubicles because costs may be decreased (e.g., since they may move with the occupant of a building rather than staying in the building due to coupling with building), the aesthetics and/or configuration can be easily changed (e.g., since panels (102) may be removed and/or replaced without uncoupling the entire system of cubicles), installation speed may improve, costs may decrease due to ease of installation, etc.

In various implementations, a panel mounting system (100) may be utilized for railing in commercial and/or residential buildings and/or outdoor areas. The etc.

In some implementations the rail mounting system may be installed as a handrail. FIG. 18 illustrates an implementation of a handrail attached to a panel (102). The rail assembly (104) may have a housing (602) shape similar to a conventional handrail, such as the illustrated shape of the housing (602). The rail assembly (104) may be attached to a panel (102) serving as a wall, barrier, and/or stairway. For example, glass and/or plexiglass stairways may utilize the rail assembly (104) for a clean and simple handrail. In some implementations, the bottom portion of the panel (102) may be attached to the floor using a conventional method and/or a rail assembly (104) that is capable of mounting to the floor, such as the rail assembly (104) illustrated in FIG. 6.

In some implementations, the rail assembly (104) may include one lock(s) (620) and a panel (102) retained by the rail assembly (104) may be disposed between the lock(s) (620) and a wall (e.g., a fixed position wall of the housing (602).

In some implementations, a rail assembly (104) may include more than one cam (202). For example, as illustrated in FIG. 3, a cam key (636) for each cam (202) may be accessible at each end of the panel (102). Thus, minor adjustments may be more easily made, in some implementations. In some implementations, torque in the middle of the cam (202) may be decreased by using more than one cam (202) in a rail assembly (104).

Relative orientations of components to each other and in applications have been described; however, the orientations are not limited but exemplary.

The described process(es) may be implemented by various described system(s). In addition, various operation(s) of the process(es) may be added, deleted, and/or modified. In some implementations, a process may be performed in combination with other process(es) or operation(s) thereof.

Although users have been described as a human, a user may be a person, a group of people, a person or persons interacting with one or more tools.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a door" includes a combination of two or more doors and reference to "a panel" includes diverse types and/or combinations of panels.

Although the present disclosure has been described in detail, it should be understood that various changes, substitutions, and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While FIGS. 1-18 shows a configuration of components, other configurations may be used without departing from the scope of the invention. For example, various components may be combined to create a single component. As another example, the functionality performed by a single component may be performed by two or more components.

Figure 19:
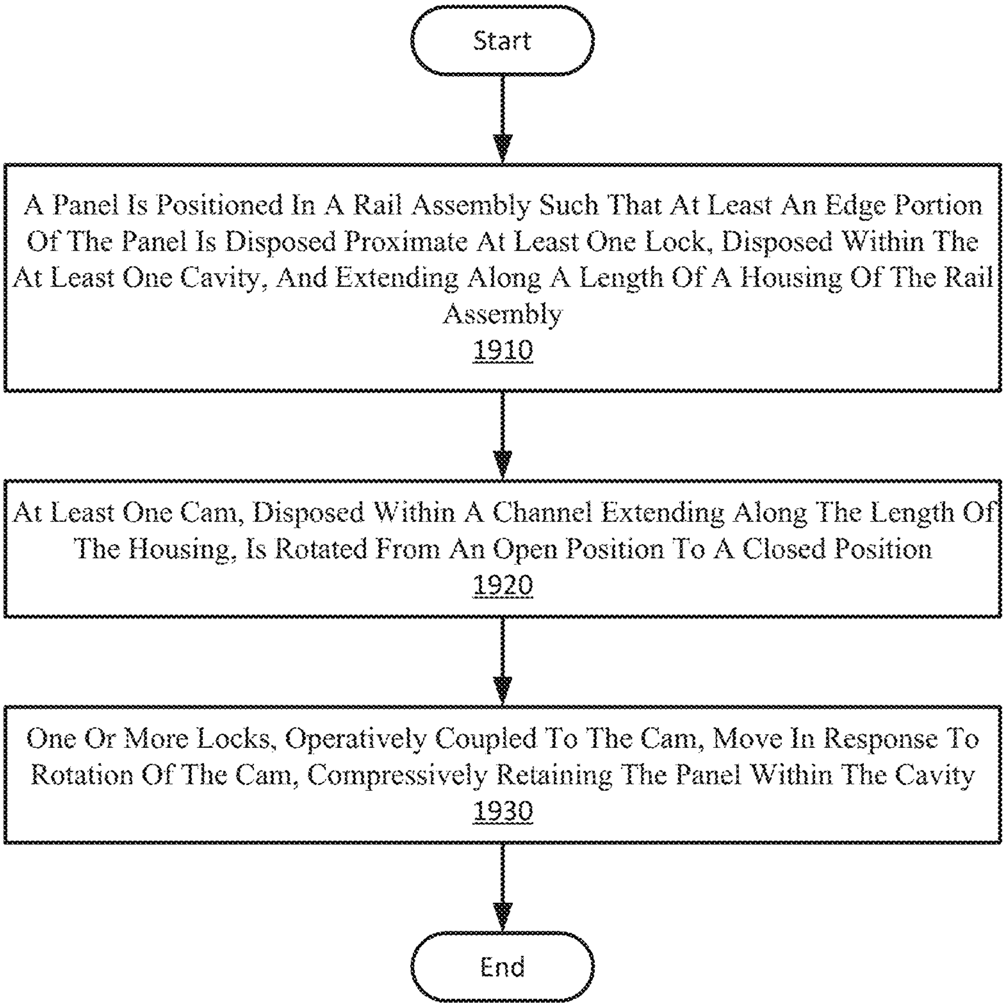
FIG. 19 is a flowchart of a method for attaching a rail assembly to a panel according to illustrative embodiments.

Turning to FIG. 19, a flowchart of a method for attaching a rail assembly to a panel is shown according to illustrative embodiments. The method of FIG. 19 can be used to couple of the rail assembly (104) to the panel (102) illustrated in FIGS. 1-18 above.

At step (1910), a panel is positioned in a rail assembly such that at least an edge portion of the panel is disposed proximate at least one lock, disposed within the at least one cavity, and extending along a length of a housing of the rail assembly.

At step (1920), at least one cam, disposed within a channel extending along the length of the housing, is rotated from an open position to a closed position.

At step (1930), one or more locks, operatively coupled to the cam, move in response to rotation of the cam, compressively retaining the panel within the cavity. In some embodiments, the rotation of the cam causes both perpendicular movement and parallel movement of the one or more locks relative to a center axis of the housing.

While the various steps in this flowchart are presented and described sequentially, at least some of the steps may be executed in different orders, may be combined or omitted, and some of the steps may be performed in parallel. Furthermore, the steps may be performed actively or passively.

The term "about," when used with respect to a physical property that may be measured, refers to an engineering tolerance expected by or determined by one ordinary skill in the art. The exact quantified degree of an engineering tolerance depends on the product being produced, the process being performed, or the technical property being measured. For a non-limiting example, two angles may be "about congruent" if the values of the two angles are within ten percent of each other. However, if the ordinary artisan determines that the engineering tolerance for a particular product should be tighter, then "about congruent" could be two angles having values that are within one percent of each other. Likewise, engineering tolerances could be loosened in other embodiments, such that "about congruent" angles have values within twenty percent of each other. In any case, the ordinary artisan is capable of assessing what is an acceptable engineering tolerance for a particular product, and thus is capable of assessing how to determine the variance of measurement contemplated by the term "about."

As used herein, the term "connected to" contemplates at least two meanings. In a first meaning, unless otherwise stated, "connected to" means that component A could have been separate from component B, but is joined to component B in either a fixed or a removably attached arrangement. In a second meaning, unless otherwise stated, "connected to" means that component A is integrally formed with component B. Thus, for example, assume a bottom of a pan is "connected to" a wall of the pan. The term "connected to" may be interpreted as the bottom and the wall being separate components that are snapped together, welded, or are otherwise fixedly or removably attached to each other. Additionally, the term "connected to" also may be interpreted as the bottom and the wall being contiguously together as a monocoque body formed by, for example, a molding process.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the term "or" is an "inclusive or" and, as such, includes the term "and." Further, items joined by the term "or" may include any combination of the items with any number of each item, unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A rail assembly comprising:
- a housing comprising a channel and at least one cavity;
- at least one lock, disposed within the at least one cavity, and extending along a length of the housing;
- at least one cam, disposed within the channel and extending along the length of the housing, wherein the cam is rotatable between an open position and a closed position;
- wherein rotation of the cam about an axis of rotation substantially parallel to the length of the housing causes movement of the one or more locks to compressively retain a panel within the cavity.

2. The rail assembly of claim 1, wherein the housing further comprises:
- at least one arm extending along the length of the housing; and
- at least one track, disposed within a first cavity of the at least one cavity, and extending along the length of the housing.

3. The rail assembly of claim 2, wherein the at least one arm further comprises:
- a lip that extend inwards from the arm relative to a center axis of the housing, wherein the lip is configured to inhibit release of the at least one lock from the cavity of the housing.

4. The rail assembly of claim 2, wherein the at least one lock further comprises:
- at least one flange, slidably engaged between the at least one arm and the at least one track.

5. The rail assembly of claim 4, wherein the rotation of the cam causes perpendicular movement of the one or more lock relative to a center axis of the housing.

6. The rail assembly of claim 4, wherein the rotation of the cam causes parallel movement of the one or more lock relative to a center axis of the housing.

7. The rail assembly of claim 4, wherein the at least one lock further comprises:
- at least one pad coupled to an exterior surface of the lock and disposed on a side of the lock opposite from the flange;
- wherein the at least one pad is configured to compressively contact the panel as the cam is rotated to the closed position.

8. The rail assembly of claim 2, wherein the at least one cavity is the first cavity, and wherein the housing further comprises:
- at least one leg extending along the length of the housing opposite the at least one arm, wherein the at least one leg defines a second cavity that is configured to receive mounting components for securing the rail assembly to a frame.

9. The rail assembly of claim 1, wherein the at least one cam further comprises:
- a cam key, wherein the cam key has a predefined shape that corresponds to a tool used to rotate the cam;
- wherein the cam key comprises at least one of:
  - a male portion comprising a protrusion extending from at least one end of the cam; or
  - a female key portion comprising an opening extending into the at least one end and at least partially through the cam.

10. The rail assembly of claim 1, further comprising:
- at least one endcap removably couplable to the housing, wherein when coupled to the housing, the endcap is configured to inhibit rotation of the cam.

11. The rail assembly of claim 10, where in the endcap further comprises:
- a cap key, wherein the cap key is configured to engage a cam key of the at least one cam.

12. A glass door comprising:
- a glass panel;
- one or more rail assembly, removably coupled to the glass panel, wherein each rail assembly comprises:
  - a housing; comprising a channel and at least one cavity;
  - at least one lock, disposed within the at least one cavity, and extending along a length of the housing; and
  - at least one cam, disposed within the channel and extending along the length of the housing, wherein the cam is rotatable between an open position and a closed position;
- wherein rotation of the cam about an axis of rotation substantially parallel to the length of the housing causes movement of the one or more locks to compressively retain the glass panel within the cavity.

13. The glass door of claim 12, wherein the housing further comprises:
- at least one arm extending along the length of the housing; and
- at least one track, disposed within a first cavity of the at least one cavity, and extending along the length of the housing.

14. The glass door of claim 13, wherein the at least one arm further comprises:
- a lip that extend inwards from the arm relative to a center axis of the housing, wherein the lip is configured to inhibit release of the at least one lock from the cavity of the housing.

15. The glass door of claim 13, wherein the at least one cavity is the first cavity, and wherein the housing further comprises:
- at least one leg extending along the length of the housing opposite the at least one arm, wherein the at least one leg defines a second cavity that is configured to receive mounting components for securing the rail assembly to a frame.

16. The glass door of claim 13, wherein the at least one lock further comprises:
- at least one flange, slidably engaged between the at least one arm and the at least one track.

17. The glass door of claim 16, wherein the rotation of the cam causes perpendicular movement of the one or more lock relative to a center axis of the housing.

18. The glass door of claim 16, wherein the rotation of the cam causes parallel movement of the one or more lock relative to a center axis of the housing.

19. A method for attaching a rail assembly to a panel, the method comprising:
- positioning the panel in the rail assembly such that at least an edge portion of the panel is disposed proximate at least one lock, disposed within at least one cavity, and extending along a length of a housing of the rail assembly;

rotating at least one cam about an axis of rotation substantially parallel to the length of the housing, wherein the cam is disposed within a channel extending along the length of the housing and is rotated from an open position to a closed position; and moving one or more locks, operatively coupled to the cam, in response to rotation of the cam, wherein movement of the locks compressively retains the panel within the cavity.

20. The method of claim 19, wherein rotation of the cam causes both perpendicular movement and parallel movement of the one or more locks relative to a center axis of the housing.

* * * * *